United States Patent
Bergdahl et al.

(10) Patent No.: US 8,444,012 B2
(45) Date of Patent: May 21, 2013

(54) SINGLE PIECE DEVICE FOR STORING, METERING AND MIXING A POWDER WITH A DILUENT

(75) Inventors: Johan Bergdahl, Lausanne (CH); Richard Luke Murphy, Montbrelloz (CH); John Meldrum, Orbe (CH); Stephane Hentzel, Yvonand (CH)

(73) Assignee: Nestec S.A., Vevey (CH)

( * ) Notice: Subject to any disclaimer, the term of this patent is extended or adjusted under 35 U.S.C. 154(b) by 404 days.

(21) Appl. No.: 12/672,811

(22) PCT Filed: Jul. 24, 2008

(86) PCT No.: PCT/EP2008/059749
§ 371 (c)(1),
(2), (4) Date: Jun. 4, 2010

(87) PCT Pub. No.: WO2009/019141
PCT Pub. Date: Feb. 12, 2009

(65) Prior Publication Data
US 2011/0121017 A1      May 26, 2011

(30) Foreign Application Priority Data
Aug. 9, 2007   (EP) .................................... 07114057

(51) Int. Cl.
*G01F 11/10*      (2006.01)

(52) U.S. Cl.
USPC .................. 222/1; 222/636; 222/71; 222/105; 222/368; 222/129.3; 222/145.5; 99/289 R

(58) Field of Classification Search .................. 222/71, 222/129.3, 129.4, 145.5, 181.1, 325, 344, 222/355, 367, 368, 424.5, 630, 636; 99/287, 99/289 R; 366/10, 181.1, 178.1
See application file for complete search history.

(56) References Cited

U.S. PATENT DOCUMENTS

| | | | | |
|---|---|---|---|---|
| 2,200,713 A | * | 5/1940 | Ericson et al. ............. | 52/742.13 |
| 2,326,276 A | * | 8/1943 | Avedikian ................. | 222/1 |
| 2,537,545 A | * | 1/1951 | Patterson .................. | 222/339 |
| 2,575,967 A | * | 11/1951 | Cecil ....................... | 222/39 |
| 2,802,599 A | * | 8/1957 | Callahan et al. .......... | 222/1 |

(Continued)

FOREIGN PATENT DOCUMENTS

| | | |
|---|---|---|
| EP | 1768925 | 4/2007 |
| GB | 1591803 | 6/1981 |
| WO | 2006005401 | 1/2006 |
| WO | 2007063503 | 6/2007 |

OTHER PUBLICATIONS

International Search Report, PCT/EP2008/059749, dated Oct. 17, 2008, 2 pgs.

*Primary Examiner* — Kevin P Shaver
*Assistant Examiner* — Patrick M Buechner
(74) *Attorney, Agent, or Firm* — K&L Gates LLP

(57) ABSTRACT

A device stores and meters a powder and mixes the powder with a diluent to prepare a food product. The device is able to be connected to a tank containing the diluent and to a source of air. The device includes a multidose container to form a reserve of powder, a powder dosing system, a powder duct integrated in an air chamber that can carry air around the powder duct outlet. The powder duct outlet emerges in a mixing chamber that includes a diluent inlet and a food product outlet, the whole forming a single piece disposable device.

18 Claims, 3 Drawing Sheets

U.S. PATENT DOCUMENTS

| | | | |
|---|---|---|---|
| 3,152,728 A * | 10/1964 | McCarter | 222/129.4 |
| 3,300,094 A * | 1/1967 | Rockola | 222/129.4 |
| 3,550,814 A * | 12/1970 | Von Lersner | 222/129.3 |
| 4,089,050 A * | 5/1978 | Huet | 366/181.1 |
| 4,165,821 A * | 8/1979 | Martin et al. | 222/129.4 |
| 4,165,822 A * | 8/1979 | Jaudt | 222/636 |
| 4,172,669 A * | 10/1979 | Edelbach | 366/181.1 |
| 4,184,258 A * | 1/1980 | Barrington et al. | 433/88 |
| 4,194,651 A * | 3/1980 | Martin et al. | 222/108 |
| 4,357,861 A * | 11/1982 | Di Girolamo | 99/323.3 |
| 4,528,848 A * | 7/1985 | Hafner | 73/218 |
| 4,635,824 A * | 1/1987 | Gaunt et al. | 222/129.1 |
| 5,189,965 A * | 3/1993 | Hobbs et al. | 111/178 |
| 5,305,923 A | 4/1994 | Kirschner et al. | |
| 5,400,972 A * | 3/1995 | Maier et al. | 239/422 |
| 5,931,343 A * | 8/1999 | Topar et al. | 222/56 |
| 5,975,365 A * | 11/1999 | Hsieh | 222/129.4 |
| 6,330,850 B1 * | 12/2001 | Rosse | 99/289 R |
| 6,550,648 B2 * | 4/2003 | Bardin | 222/129.3 |
| 6,729,753 B2 * | 5/2004 | Artman et al. | 366/164.6 |
| 6,834,779 B2 * | 12/2004 | Ufheil et al. | 222/232 |
| 6,868,988 B2 * | 3/2005 | Ufheil et al. | 222/129.1 |
| 6,932,245 B2 * | 8/2005 | Whippie et al. | 222/235 |
| 7,048,149 B1 * | 5/2006 | Lassota | 222/129.3 |
| 7,226,631 B2 * | 6/2007 | Thakur et al. | 426/477 |
| 7,398,725 B2 * | 7/2008 | Rebordosa et al. | 99/289 R |
| 8,151,693 B2 * | 4/2012 | Sala et al. | 99/287 |
| 2003/0189872 A1 * | 10/2003 | Artman et al. | 366/165.3 |
| 2004/0226962 A1 * | 11/2004 | Mazursky et al. | 222/95 |
| 2007/0272317 A1 * | 11/2007 | Klopfenstein et al. | 137/889 |
| 2009/0057350 A1 * | 3/2009 | Lin | 222/636 |

* cited by examiner

SINGLE PIECE DEVICE FOR STORING, METERING AND MIXING A POWDER WITH A DILUENT

The present invention relates to a system for preparing and delivering a mixture of a soluble powder and a diluent. More particularly, the invention relates to the preparation and delivery of drinks, or other liquid food products, by metering a food powder and mixing this food powder with a diluent. The invention finds an application in the delivery of drinks, with or without froth, hot or cold, from a powder and water, hygienically, easily and quickly.

BACKGROUND

In conventional drinks dispensers, the drinks are reconstituted from a liquid concentrate or powder contained in reservoirs. The liquid concentrate or the powder is metered then mixed with a diluent, generally hot or cold water, inside the dispenser, passing through pipes, pumps and mixing bowls. Mixing is generally performed by a mechanical stirrer contained within a chamber. The conventional preparation of these drinks therefore requires a great deal of maintenance and cleaning in order to keep those parts that are in contact with the food product constantly clean and avoid the risks of contamination and bacterial growth. The machines also represent a significant investment on the part of the operators.

Some of these problems have been solved with systems for delivering drinks from a disposable or recyclable package containing a liquid concentrate. General solution consists in incorporating the food liquid pump into the package and controlling the activation of this pump by the machine by connecting the package to the machine and, more particularly, by connecting the pump to the machine. The operator needs merely to remove the package once it is empty and replace it with a new one in order to proceed with dispensing another drink. Any cleaning is then no longer required. Such a solution is described in EP-A 1-1 768 925.

This solution of a disposable storing, metering and delivering package has never been applied for the systems delivering drinks from a disposable or recyclable package containing soluble powder. It is effectively known that powders are very sensitive to humidity and air atmosphere and it was obvious that the principle developed for the liquid concentrates could not be applied for the powders without problems. The main problem is that the dosing system for metering the powder would block further to the partial dissolution of powder in the delivery part of the system in contact with atmosphere. That would lead to false powder dosing and then to the complete blocking of the system.

Yet such a type of disposable or recyclable package that enables minimal cleaning, easy and quick re-loading would present big advantages for the delivery of powders. It would in particular presents an advantage that is specific to powder: it would eliminate the refilling step consisting in opening a storage container and transferring its content in the system reservoir by direct pouring, said step conducting in an aeration of the powder and a degradation of its quality.

There is therefore a need for a disposable storing, metering and delivering package containing powder that provides solutions to all the aforesaid problems.

SUMMARY

In a first aspect, the invention relates to a device for storing and metering a powder and mixing said powder with a diluent to prepare a food product, the device being able to be connected to a tank containing the diluent and to a source of air, the device comprising:
 a multidose container to form a reserve of powder,
 a powder dosing system to deliver powder from the multidose container to a powder duct,
 the powder duct being integrated in an air chamber configured to carry air around the powder duct outlet,
 said powder duct outlet emerging in a mixing chamber comprising a diluent inlet and a food product outlet,
 the whole forming a single piece disposable device.

The device of the present invention is only one piece integrating the above different elements. Each element is positioned relatively to the others so that the powder from the multidose container issues in the powder dosing system, the latter delivering powder from the multidose container in the powder duct which delivers the metered powder to the mixing chamber. According to the invention, the powder duct is integrated in an air chamber. The air chamber comprises an air inlet and air outlet, the latter surrounding the powder duct outlet that emerges in the mixing chamber.

Thus the device according to the invention provides an improved solution for storing, metering, delivering a powder and mixing it with a diluent. Through the complete integration of the different elements in a single piece device and the integration of the powder duct in an air chamber, the freshness and flowability of the powder can be preserved.

An important element of the device according of the present invention is the air chamber which is configured so as to provide an air current around the powder duct. Said air current is oriented in the direction of the mixing chamber in order to surround the powder duct outlet at the place where the powder duct outlet emerges in the mixing chamber. In the air chamber, the air current is preferably essentially parallel to the powder duct. Such a configuration can be easily obtained by an air chamber surrounding the powder duct and in particular by an air chamber that is a tube concentric to the powder duct. In the preferred embodiment of the invention, the air chamber is configured in order to provide at the powder duct outlet a ring of air flow of homogeneous profile around the flow of powder. By homogeneous profile, it is meant that the air presents essentially the same flow value and the same flow direction all around the powder duct outlet.

Is it preferred that the air chamber outlet and the powder duct outlet enter the mixing chamber in essentially the same cutting plane. For that reason, it is preferable that the air tube presents a sufficient length, because if it is too short, it may not provide the function of avoiding the ascent of steam in the powder duct. The air intake of the air chamber may preferably present such an angle with powder duct longitudinal axis that the current of air is almost parallel to the powder duct.

The device comprises a mixing chamber for wetting and mixing the powder. Under its simpler form, the mixing chamber is demarcated by a bottom wall and a side wall extending upwardly. It is preferably an opened mixing chamber: it presents an upper opening for evacuating steam. The opening is generally placed at the centre of the top of the mixing chamber. The mixing chamber is usually symmetrical. In the preferred mode, the mixing chamber is conical. According to the invention, the mixing chamber is whipperless: no whipping means are necessary because mixing is obtained by the stream of diluent and the form of the chamber. The mixing chamber can be close and pressurized.

As a preference, the outlet of the powder duct enters the upper part of the mixing chamber in a place that is offset with regard to the longitudinal axis of the mixing chamber. It means then that the outlet of the powder duct does not emerge at the centre of the top of the mixing chamber. It is also preferred that the longitudinal axis of the powder duct presents an angle comprised between 0 and around 45 with the longitudinal axis of the mixing chamber, more preferably around 45°.

The powder dosing system comprises a dosing chamber and coupling means enabling the dosing chamber to be driven by a motor external to the device of the present invention. The dosing chamber may be of any known type of powder dosing chamber like a screw, an auger, a barrel, a sliding chamber, a revolving chamber. A barrel with rotating cavities is preferred. The powder dosing system is located at the bottom of the container for receiving powder and for transporting a predetermined amount of powder toward the powder duct.

The powder dosing system and the diluent supply to the device according to the present invention are intended to be controlled by means of a dispensing base device with which the powder dosing system and the diluent supply are docked in a complementary manner. The second device with which the first docks is known as a "base station" in the remainder of the description, for greater conciseness and clarity. Thus, coupling means are provided and configured in such a way as to connect the first device to the base station, which is itself capable of providing the diluent supply and the means for driving the powder dosing system. Such replacement makes it possible to dispense without the need for maintenance and cleaning of the powder dosing system and the mixing chamber. The device presents coupling means with an air source, usually a blower. Preferably the diluent coupling means, means for driving the powder dosing system and air coupling means are provided and configured in such a way as to detachably connect the device to the base station capable of providing the diluent supply, the air supply and the means for driving the powder dosing system.

It is preferable that the diluent inlet, the powder dosing system coupling means and the air intake lie on the same side of the device. Such a device fits in a simple and quick way against the base station comprising the tank containing the diluent, the means for driving the powder dosing system and the source of air. The coupling of the device according to the invention with the base station can be made by manually plugging into the base station itself comprising complementary coupling means.

Thus, the user can easily perform the docking operation by hand in a simple movement by taking hold of the device and pushing it against the base station. More specifically, the coupling means also comprise means for translational guidance, in at least one direction that encourages plugging-in or docking, of the device with complementary guide means on the base station.

The device according to the invention may also comprise a code that can be read by a reader associated with a base station to which the device is coupled. The code comprises information referring to the identity and/or the nature of the powder and/or to parameters concerned with the activation of the diluent supply and/or liquid pump drive means. The code may, for example, be used to manage the flow rate of the liquid pump and/or of the diluent pump, contained in the base station, so as to control the powder/diluent ratio. Other uses of the code are possible, such as checking the authenticity of the product contained in the container or alternatively adjusting the means to alter the temperature of the diluent.

The food product outlet of the device enables the delivery of the food product directly into a receptacle. A receptacle is to be understood as meaning, for example, a glass, a bowl or a mug or any other receptacle to serve to the consumer.

The multidose container may be disposable or recyclable. It may be a non-collapsible or a collapsible. It may be, for instance, a bottle, a pouch, a sachet or the like. It may be made of plastic, cardboard paper, aluminum or a mixture and/or laminate of the materials. It is preferably collapsible. Preferably, the container is in a monolayer or multi-layer plastic material with humidity and oxygen barriers. The prevention of moisture entry also contributes to the smooth dispensing of the powder.

All the other parts of the device according to the present invention are preferably made of plastic, such as an injected or molded plastic. The device may thus be used for a limited number of metering operations and then disposed of or recycled for being refilled.

The different elements of the device may be connected by permanent or detachable means, preferably by permanent means. Permanent means may be designed to be sealing, welding, bonding, non-reversible clipping means, etc means. Detachable means may mean a device formed of a threaded portion or equivalent complementary mechanical engagement means on one of the elements of the device which collaborate with a threaded portion or complementary mechanical engagement means belonging to another element of the device.

In a preferred way, the device according to the present invention is disposed when the multidose container is empty.

Where the container is in a soft component, it may present holding means in its upper part, said holding means cooperating with complementary holding means in the base station. This holding means can be for example the means for translational guidance such as described above. They help in a better delivering of the powder from the container.

According to the invention the term powder means any bulk material that can be either under the form of powders or particles like granulates, granules, grains. The powder inside the device may be a food concentrate intended to reconstitute a hot or cold, frothy or nonfrothy drink. For example, the powder is a powder of soluble milk, coffee, cocoa, tea or a combination thereof. Other powdered foods such as dried mashed potatoes or other dried foods, sauce or gravy powders, soup powders or the like may also be used in this invention.

In a second aspect, the invention relates to a method for storing and metering a powder and mixing said powder with a diluent to prepare a food product by the means of:

a powder multidose container,
a powder dosing system,
a powder duct integrated in an air chamber,
a mixing chamber in which the powder duct emerges and comprising a diluent inlet and a food product outlet,
wherein the powder container, the powder dosing system, the powder duct, the air chamber and the mixing chamber forms a single piece device and the air chamber carries an air current around the powder duct, said current of air being oriented in the direction of the mixing chamber.

As mentioned above, it is preferred that the air current is essentially parallel to the powder duct. In the preferred embodiment of the invention, at the powder duct outlet the ring of air flow around the flow of powder presents a homogeneous profile. The air current presents preferably a linear flow at the outlet of the air chamber. A linear flow is sufficient to guarantee that the steam do enter in the powder duct but not too important to disturb the powder flow issued from the powder and its re-ascent in the powder duct for example.

As a preference, the powder duct enters the upper part of the mixing chamber in a place that is offset with regard to the longitudinal axis of the mixing chamber. It is also preferred that the flow of powder is introduced in the mixing chamber with an angle comprised between 0 and around 45° with the longitudinal axis of the mixing chamber, more preferably around 45°.

The device and the method of the present invention present several advantages. The powder dosing system does not require any cleaning since it is disposable. The operators do not have to transfer powder from a container into a canister because the device according to the invention incorporates the both functions of storing and dispensing. This prevents powder being accidentally spilt inside the beverage dispenser. Then it removes the necessity for a trained or skilled operator to replace powder in the beverage machine. Dispensers implementing the device of the present invention provide higher quality beverages because the powder is contained in a sealed container rather than in an opened canister, therefore having less contact with the air atmosphere. There is also an increased quality control because the powders are filled in the containers at the factory and are then placed directly in the base station.

The invention also covers a device for storing and metering a powder in order to further mix said powder with a diluent to prepare a food product, the device being able to be connected to a tank containing the diluent, the device comprising:
- a multidose container to form a reserve of powder,
- a powder dosing system, and
- a powder duct,
- the whole forming a single piece disposable device.

The powder dosing system can comprise a dosing chamber and coupling means enabling the dosing chamber to be driven by a motor external to the device. The dosing chamber of the powder dosing system can comprise an endless screw, an auger, a barrel, a sliding chamber or a revolving chamber.

The invention also extends to the field of the preparation of non-food product.

The characteristics and advantages of the invention will be better understood in relation to the figures which follow.

DETAILED DESCRIPTION

Figure 1:
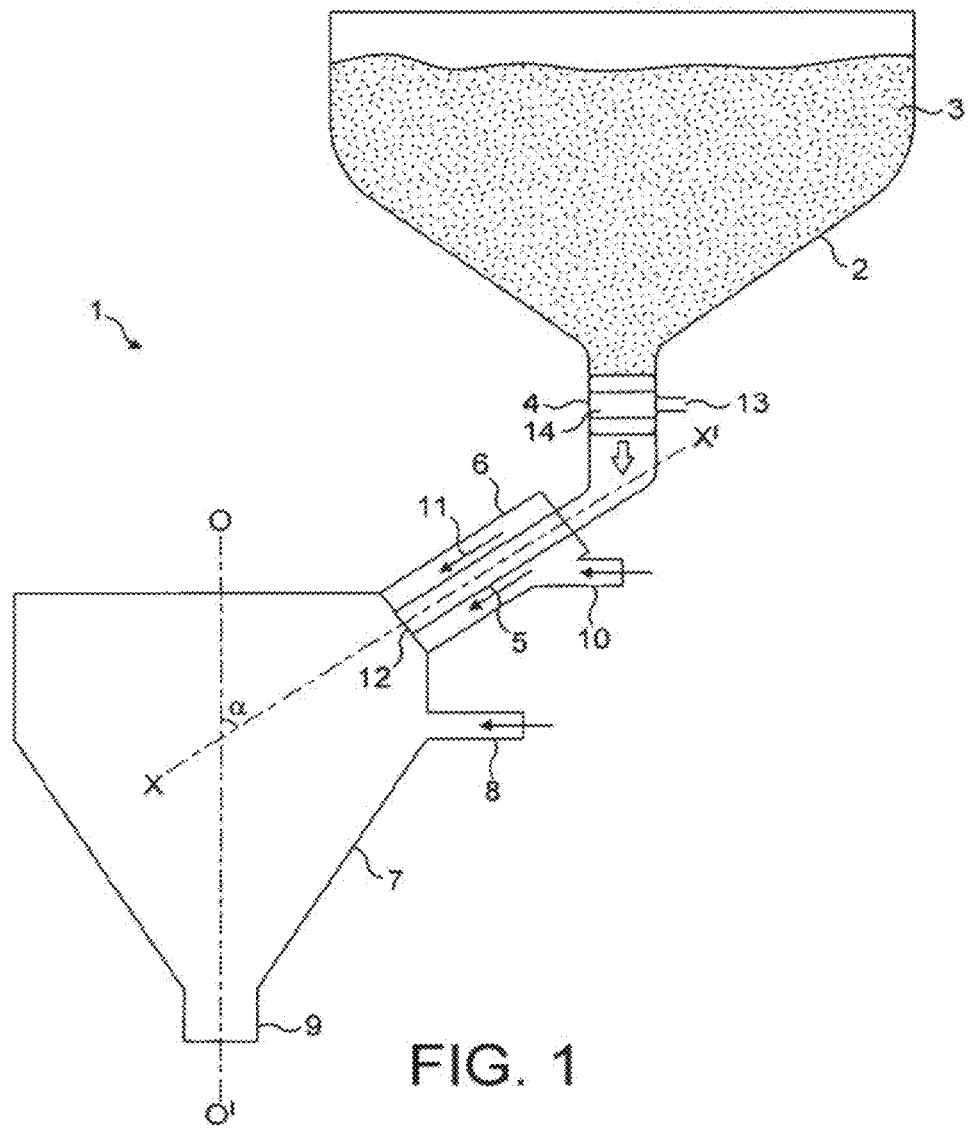
FIG. 1 depicts a schematic view of the device according to the present invention.

FIG. 1 illustrates a device 1 of the invention. The device 1 comprises a container 2 that is filled with a food ingredient powder 3 which falls by gravity on the dosing system 4 composed of a dosing chamber 14 and coupling means 13 enabling the dosing chamber to be driven by an external motor. Premetered powder 3 is dosed in the dosing system 4 and is delivered through powder duct 5 in the bowl of the mixing chamber 7 where it is mixed with a pre-metered amount of hot water introduced through the diluent inlet 8 of the mixing chamber 7, said diluent inlet being coupled to an external diluent supply. The resulting mixture is dispensed through food product outlet 9. The device 1 comprises a cylindrical air chamber 6 concentric to and surrounding the powder duct 5. The air chamber aims at creating an air flow 11 around the powder duct outlet 12 emerging in the mixing chamber 7. For this, the air chamber is provided with an air intake tube 10 coupled to an external source of air; the form of the air chamber 6 and the orientation of the air intake tube 10 favor the formation of an air flow 11 parallel to the powder duct 5 and which emerges in the mixing chamber 7 in a parallel way to the powder flow. The powder duct is so oriented in a direction that is offset relative to the longitudinal central axis 00' of the chamber. Preferably the longitudinal axis XX' of the powder duct 5 presents an angle ex, with the longitudinal axis 00' of the mixing chamber 7.

This device is a single piece disposable device 1 comprising the container 2, the powder dosing system 4, the powder duct 5, the air chamber 6 and the mixing chamber 7.

Hot water is provided in the device by the means of a base station 15 to which the device is coupled: water is provided through a water reservoir, a water pump and a water heating system and finally the diluent water inlet 8. A controller can be further provided to coordinate dosing of the powder ingredient by the dosing system 4 and of the diluent by the pump of the base station upon the user actuating or being prompted to press a command on the base station.

The device may also comprise a code 16 that can be read by a reader 17 associated with base station 15 to which the device is coupled as shown, for example, in FIG. 1.

Figure 2:
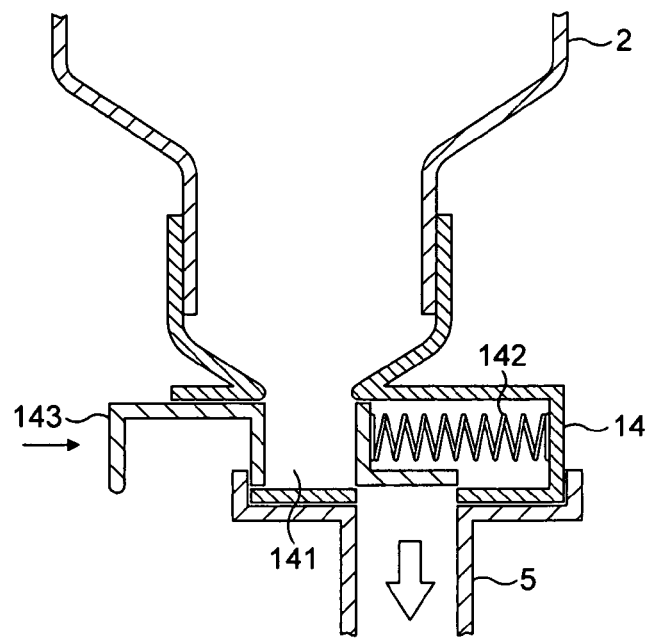
FIGS. 2 to 5 depict powder dosing system with different dosing chambers.

FIG. 2 illustrates a container 2 coupled to a powder dosing system of which dosing chamber 14 is a sliding chamber 141. The sliding chamber presents vertical walls and top and bottom openings. The sliding chamber is able to move from a loading position where it is placed under the container 2 and where it is filled with powder, to a dispensing position where it is placed above the powder duct 5, where it delivers the powder it was filled with in the loading position. The sliding chamber 141 is stressed by resilient means 142, for example a spring, in its loading position so as to isolate the reservoir 2 from the environment. The dosing system comprises a handle 143 integral with the sliding chamber 141 for displacing the sliding chamber 141 towards its dispensing position after a dose of the powder has been loaded. The handle 143 presents coupling means able to be coupled with a drive motor in the base station.

Figure 3:
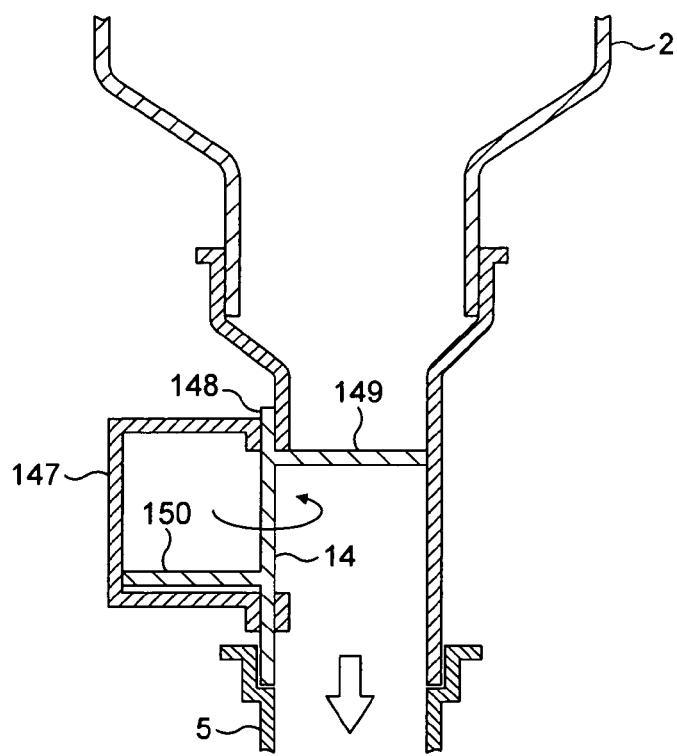

FIG. 3 illustrates a container 2 coupled to a powder dosing system of which dosing chamber 14 is a revolving chamber turning around its vertical axis 148. Two walls 149, 150 perpendicular to the axis 148 successively block and release powder from the container to the powder duct 5 further to their rotating movement around the axis 148. When a wall 149, 150 rotates outside the container outlet, it moves in a protection chamber 147 in order to avoid dirtying it.

Figure 4:
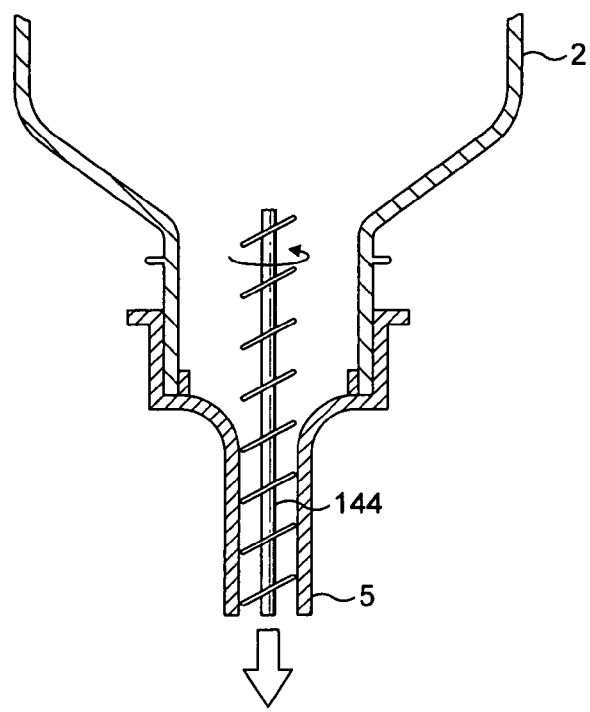

FIG. 4 illustrates a container 2 coupled to a powder dosing system of which dosing chamber 14 is an endless screw whose axis is identical to the powder duct axis and whose end portion 144 closely fits into the powder duct 5. The screw conveys and doses the powder from the container 2 in the direction of the powder duct 5.

Figure 5:
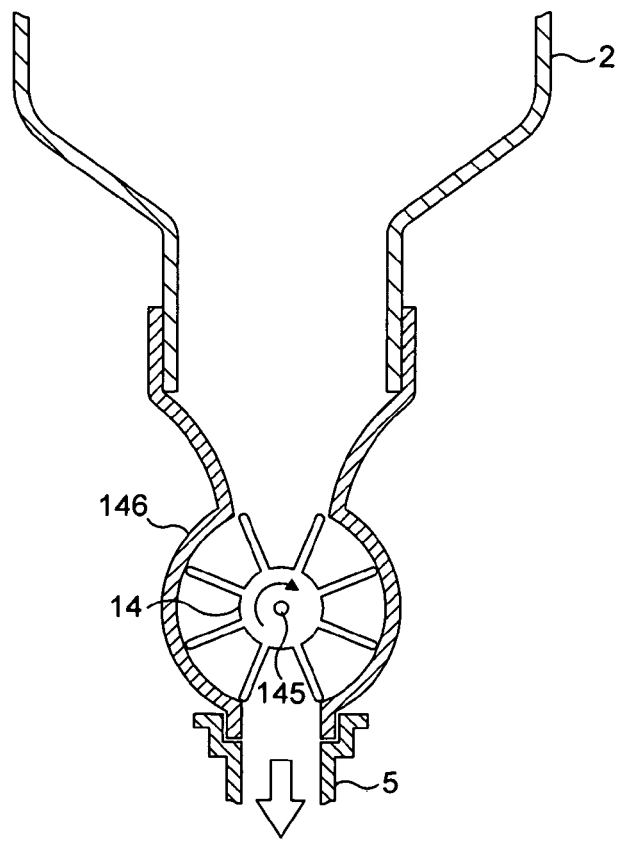

FIG. 5 illustrates a container 2 coupled to a powder dosing system of which dosing chamber 14 is a barrel closely integrated in a cylindrical chamber 146. The end of the drive shaft 145 of the barrel 14 presents coupling means able to be coupled to a drive motor in the base station.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A device for storing and metering a powder mixing the powder with a diluent to prepare a food product, the device being coupleable to a tank containing the diluent and to a source of air, the device comprising:

a multidose container to form a reserve of powder;
a powder dosing system;
a powder duct integrated in an air chamber;
the powder duct outlet opening into a mixing chamber comprising a diluent inlet and a food product outlet;
wherein the device is a single piece disposable device.

2. The device of claim 1, wherein the air chamber is configured to move air around the powder duct outlet.

3. The device of claim 1, wherein the air chamber is configured to provide an air flow essentially parallel to the powder duct.

4. The device of claim 1, wherein the air chamber surrounds the powder duct.

5. The device of claim 1, wherein the air chamber is a tube concentric to the powder duct.

6. The device of claim 1, wherein the air chamber is configured to provide at the powder duct outlet a ring of air flow of homogeneous profile around the flow of powder.

7. The device of claim 1, wherein the outlet of the powder duct enters the upper part of the mixing chamber at a location that is offset with respect to the longitudinal axis of the mixing chamber.

8. The device of claim 1, wherein the longitudinal axis of the powder duct presents an angle of between 0 and 45° with the longitudinal axis of the mixing chamber.

9. The device of claim 1, wherein the mixing chamber presents an upper opening for evacuating steam.

10. The device of claim 1, wherein the mixing chamber is a conical mixing chamber.

11. The device of claim 1, wherein the powder dosing system comprises a dosing chamber and a coupling enabling the dosing chamber to be driven by a motor external to the device.

12. The device of claim 10, wherein the dosing chamber of the powder dosing system comprises an element selected from the group consisting of an endless screw, an auger, a barrel, a sliding chamber and a revolving chamber.

13. The device of claim 1, wherein the food product outlet enables the delivery of the food product directly into a receptacle.

14. The device of claim 1, wherein the multidose container is collapsible.

15. A method for preparing a food product, the method comprising:

providing a device comprising a powder multidose container, a powder dosing system, a powder duct integrated in an air chamber, and a mixing chamber in which the powder duct emerges and comprising a diluent inlet and a food product outlet, wherein the powder container, the powder dosing system, the powder duct, the air chamber and the mixing chamber forms a single piece device and the air chamber carries an air current around the powder duct, the current of air being oriented in the direction of the mixing chamber;

metering a powder to the mixing chamber;

mixing the powder with a diluent; and preparing the food product.

16. The method of claim 15, wherein the air current is essentially parallel to the powder duct.

17. The method of claim 15, wherein at the powder duct outlet the ring of air flow around the flow of powder presents a homogeneous profile.

18. The method of claim 15, comprising disposing of the device when the multidose container is empty.

* * * * *